Figure 1:
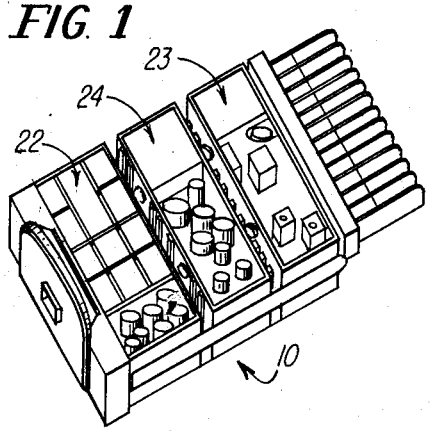

April 14, 1964   J. GERMAIN ET AL   3,129,396
ELECTRICAL FILTER APPARATUS
Original Filed July 27, 1959

INVENTOR.
Jack Germain
Robert L. Evans
BY Mueller & Aichele
Attys.

United States Patent Office 3,129,396
Patented Apr. 14, 1964

3,129,396
ELECTRICAL FILTER APPARATUS
Jack Germain, Chicago, and Robert L. Evans, Evanston, Ill., assignors to Motorola, Inc., Chicago, Ill., a corporation of Illinois
Original application July 27, 1959, Ser. No. 829,868, now Patent No. 3,059,184, dated Oct. 16, 1962. Divided and this application July 21, 1960, Ser. No. 44,414
4 Claims. (Cl. 333—70)

This invention relates generally to communications equipment, and more particularly to filter apparatus for such equipment.

This is a division of copending application Serial No. 829,868, filed July 27, 1959, now Patent No. 3,059,184 of Jack Germain, one of the joint inventors herein.

It is desired that filter apparatus for communications equipment be provided in rugged, compact form so that it can be used in vehicular communications equipment without interfering with other equipments therein, and without interference from conditions occurring during the normal operation of the vehicle. The requirements of compactness and low cost must be met without sacrifice in performance. This is particularly important with mobile communications equipment which must operate within narrow channel spacing so that the present large demand for such equipment can be satisfied without interference between various systems. Thus, component parts of such equipment should be well shielded, reliable and inexpensive to manufacture, assemble and service.

It is therefore an object of the present invention to provide an improved, compact two-way radio communication filter unit for use in vehicles.

A further object of the invention is to provide a multisection filter in which the various filter elements are well shielded from one another as well as from the surrounding equipment in which the filter is mounted, and yet which may be inexpensively mass produced with a high degree of uniformity in the shielding achieved in each filter so produced.

A feature of the invention is the provision of a filter in which the various filter elements thereof are individually mounted and enclosed in separate compartments of a shielding structure comprising just two metallic members which are easily die cast into their final form.

Another feature is the provision of a multi-compartment filter unit composed of two principal members, each of which is provided with ribs which overlap shielding portions of the other member when the two members are assembled, this engagement thereby interlocking the two members and shielding the various compartments from one another as well as from exterior effects.

A further feature is the provision of a two-part, multi-compartment filter in which conductive shielding portions of one of the parts form compartment partitions which support feedthrough connections between filter element in the various compartments and which serve as capacitor elements of the filter circuit.

Figure 4:
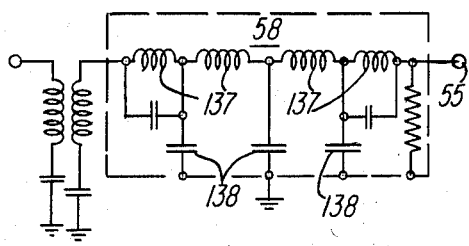
Figure 2:
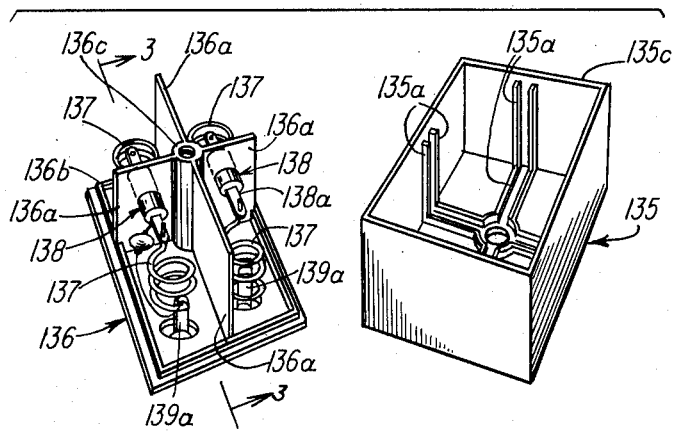
Figure 3:
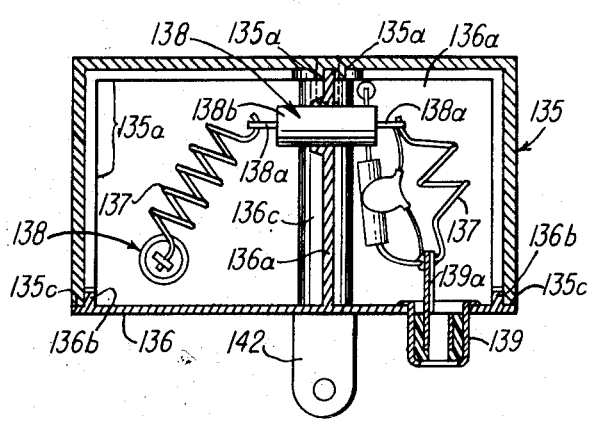

In the accompanying drawing:
FIG. 1 illustrates the arrangement of the main components of the receiver, transmitter and power supply in relation to the filter unit of the invention;
FIG. 2 is a perspective view illustrating the two main parts of the filter disassembled from one another;
FIG. 3 is a view taken in section on line 3—3 of FIG. 2; and
FIG. 4 is a schematic diagram of the circuit employed in the filter of the invention.

Referring in more detail to the accompanying drawing, FIG. 1 shows the arrangement of the parts or sections of the compact two-way radio communications unit which is especially adapted for use in vehicles as disclosed in the aforesaid copending application. The main unit 10 of the transceiver includes a receiver 22 located at the front of the unit, a transmitter 23 at the back thereof and a power supply 24 therefor positioned between receiver 22 and transmitter 23. The output of the power amplifier of transmitter 23 is applied through a harmonic filter 58 mounted therein and to terminal 55 which is connected to the antenna relay in a control unit for applying the signals from the transmitter to the antenna for radiation (FIG. 4).

The construction of the harmonic filter 58 of the transmitter is shown in FIGS. 2 and 3. This includes a housing member 135 and a cover member 136 which may be die cast of a zinc or aluminum alloy. The cover member includes partitions 136a which fit in grooves provided by ribs 135a in the housing member and ribs 136b which fit inside the open edges of the housing member to form four well shielded compartments. A coil 137 is provided in each compartment with connections between the coils being provided by feedthrough capacitors 138 which form the shunt capacitors of the harmonic filters as shown in FIG. 4. Connection to the filter is made by terminals 139 extending through the cover member 136. This construction provides very effective shielding in a compact and inexpensive unit.

The filter unit 58 is assembled as shown in the fully engaged position of FIG. 3. The box-like housing member 135 is fitted on the partitioned cover member 136, with the peripheral edges 135c around the open side of housing member 135 seated on the peripheral portion of the inside surface of cover member 136. Housing member 135 is provided with a hole at the intersection of ribs 135a which registers with a threaded hole provided in a cylindrical column 136c of the cover member 136. Column 136c is formed at the convergence of partitions 136a and is integral therewith.

The sectioned portions of FIG. 3 best illustrate the manner in which the housing and cover members 135 and 136 interlock when the shielding portions mate with the ribs of each member. When housing 135 and cover 136 are assembled together the peripheral edges 135c of housing member 135 butt against the peripheral portion of the inside surface of cover member 136. In this position ribs 136b lie closely adjacent to the inner surfaces of the four sides of housing member 135. Likewise, the outer edges of each partition 136a are received with a close fit between the corresponding pairs of ribs 135a. Hence, each of the four compartments thus formed by the two members is sealed from one another as well as from effects exterior to the filter unit.

The details of the various filter elements of the filter unit and their mounting in the separate compartments are best seen in FIGS. 2 and 3. Feedthrough capacitors 138 are provided in three of the four partitions 136a. Each feedthrough capacitor 138 includes a lead 138a connected between the ends of a pair of adjacent coils 137, the lead serving as one plate of the capacitor. Lead 138a is encased in a cylindrical dielectric member 138b which is supported in a hole in each partition 136a so as to project transversely therefrom into each compartment. These metallic shielding partitions 136a, being conductive, effectively form the other, grounded plate of each feedthrough capacitor. The ground connection to chassis unit 10 is provided by a mounting boss 142 projecting from cover member 136.

The input and output ends of the coils 137 are connected to extensions 139a of terminals 139 which are provided as separate elements and which fit into a pair of holes in the cover member 136. When the plugs of the input and output leads provided for connecting the filter unit into the transmitter are received in the jacks of terminals 139, the unit is completely sealed from external electrical fields.

The filter apparatus in accordance with the invention is provided in a strong and compact unit which may be easily installed in communications apparatus or other equipment where space is at a premium. The sections of the unit are arranged so that they are easily accessible for assembling the coils, feedthrough capacitors and terminals therein. The use of a box-like five sided housing member together with a cover member having integral partitions extending perpendicular therefrom provides a physical configuration which is easily die cast, thereby eliminating costly mechanical assembly of shielding springs and contacts of prior art shields.

We claim:

1. A harmonic filter including in combination, a first conducting box-like member having five closed sides and one open side, a second conducting member including a cover portion and two intersecting right angle partition portions which extend therefrom, said members when assembled with said cover portion closing said open side of said box-like member forming four separate shielded cavities, said members being die cast and having ribs to provide interlocking fit therebetween, four inductance elements supported on said second member so that one is positioned in each of said cavities when said members are assembled, three feedthrough capacitors in said partition portions interconnecting said inductance elements in series and forming shunt capacitors of a filter circuit, and terminal means extending through said cover portion and connected to said inductance elements to form end terminals of the filter circuit.

2. A multi-section filter including in combination, a first die-cast conducting box-like member having five closed sides and one open side, said box-like member having pairs of parallel rib portions extending from the inside surfaces of said closed sides and forming grooves extending at right angles to one another, a second die-cast conducting member including a cover portion and right angle partition portions which extend into said grooves of said box-like member when said members are assembled with said cover portion closing said open side of said box-like member, said members when assembled forming a plurality of shielded compartments separated from one another by said partition portions, a plurality of filter elements supported on said second member and positioned in said compartments, and feedthrough capacitors in said partition portions interconnecting said filter elements in different compartments and forming additional filter elements.

3. A multi-section filter including in combination, a first die-cast conducting box-like member having five closed sides and one open side, said box-like member having pairs of parallel rib portions extending from the inside surfaces of said closed sides and forming grooves extending at right angles to one another, a second die-cast conducting member including a cover portion having a peripheral rib portion and right angle partition portions extending from the inside surface thereof, said partition portions extending into said grooves of said box-like member and said peripheral rib portion fitting against the portion of the inside surfaces of said closed sides adjacent said open side of said box-like member when said members are assembled with said cover portion closing said open side of said box-like member, said members when assembled forming a plurality of shielded cavities, a plurality of filter elements supported on said second conducting member and positioned in said shielded cavities, and feedthrough capacitors in said partition portions interconnecting said filter elements in different cavities and forming additional filter elements.

4. A harmonic filter including in combination, a first die-cast conducting box-like member having five closed sides and one open side with a hole in the closed side opposite said open side, a second die-cast conducting member including a cover portion and two intersecting right angle partition portions which extend therefrom and which converge into a column portion having an axial threaded hole in the extended end thereof, said members when assembled with said cover portion closing said open side of said box-like member forming four separate shielded cavities, said holes of said members being aligned when said members are assembled to provide an interlocking engagement therebetween, four inductance elements supported on said second member with one positioned in each of said cavities, three feedthrough capacitors in said partition portions interconnecting said inductance elements in series and forming shunt capacitors of a filter circuit, and terminal means extending through said cover portion and connected to said inductance elements to form end terminals of the filter circuit.

References Cited in the file of this patent

UNITED STATES PATENTS

| | | |
|---|---|---|
| 1,953,465 | Chestnut | Apr. 3, 1934 |
| 2,014,521 | Casper | Sept. 17, 1935 |
| 2,163,775 | Conklin | June 27, 1939 |
| 2,221,105 | Otto | Nov. 12, 1940 |
| 2,779,924 | Du Chatellier | Jan. 29, 1957 |
| 2,803,745 | Pan et al. | Aug. 20, 1957 |
| 2,844,801 | Sabaroff | July 22, 1958 |
| 2,888,652 | Niedreman et al. | May 26, 1959 |
| 2,939,095 | Chertok | May 31, 1960 |

FOREIGN PATENTS

| | | |
|---|---|---|
| 463,443 | Canada | Feb. 28, 1950 |

OTHER REFERENCES

Rountree: Radio and Television News, June 1953, pages 47 and 102.